United States Patent [19]
Johansson et al.

[11] Patent Number: 5,186,891
[45] Date of Patent: Feb. 16, 1993

[54] SWIRL VANES IN INCONEL SPACER

[75] Inventors: Eric B. Johansson, Wrightsville Beach, N.C.; Bruce Matzner, San Jose, Calif.

[73] Assignee: General Electric Company, San Jose, Calif.

[21] Appl. No.: 702,212

[22] Filed: May 17, 1991

[51] Int. Cl.⁵ .............................................. G21C 3/34
[52] U.S. Cl. .................................. 376/438; 376/439; 376/443; 376/434
[58] Field of Search ............... 376/439, 438, 443, 444, 376/434; 976/DIG. 71, DIG. 72, DIG. 77, DIG. 79, DIG. 81

[56] References Cited

U.S. PATENT DOCUMENTS

| | | | |
|---|---|---|---|
| 3,809,609 | 5/1974 | Krawiec et al. | 376/439 |
| 3,819,477 | 6/1974 | Fromel | 376/441 |
| 4,190,494 | 2/1980 | Olsson | 376/462 |
| 4,725,403 | 2/1988 | Boettlker | 376/439 |
| 4,913,875 | 4/1990 | Johansson et al. | 376/439 |
| 5,032,351 | 7/1991 | Johansson | 376/438 |
| 5,069,864 | 12/1991 | Johansson et al. | 376/441 |

FOREIGN PATENT DOCUMENTS 2079033  1/1982  United Kingdom ............... 376/438

Primary Examiner—Donald P. Walsh
Assistant Examiner—Meena Chelliah
Attorney, Agent, or Firm—Robert R. Schroeder

[57] ABSTRACT

A swirl vane is disclosed for addition to a spring metal grid spacer utilized with a conventional nuclear boiling water nuclear reactor. The spring metal spacer includes a matrix of fuel rod containing cells. Each cell has at least one spring leg and at least two fuel rod encircling arms. The spring leg functions to bias a fuel rod contained within the cell at the spacer to one side of the cell. The two rod encircling arms define stops against which the fuel rods are biased. The cells themselves are welded into a unitary matrix and preferably surrounded by a metallic band. The improved swirl vane of this invention includes an "I" shaped spring steel strip. This strip includes top and bottom tabs for engaging the respective top and bottom grid structure of the spacer. The "I" shaped strip is then twisted to provide the swirl vane surface, this twisting being preferably slightly less than or greater than the total twisting required. Thereafter, the band is inserted to the grid and the twist used to wedge the band in place until welding has been utilized to secure the vane in place. In an alternate embodiment a row of swirl vanes is formed from a long strip so that the swirl vanes are joined at one end. Rows of swirl vanes are inserted into the spacer as units.

9 Claims, 9 Drawing Sheets

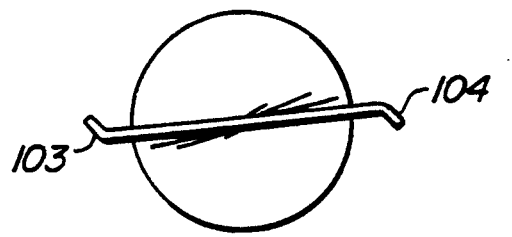
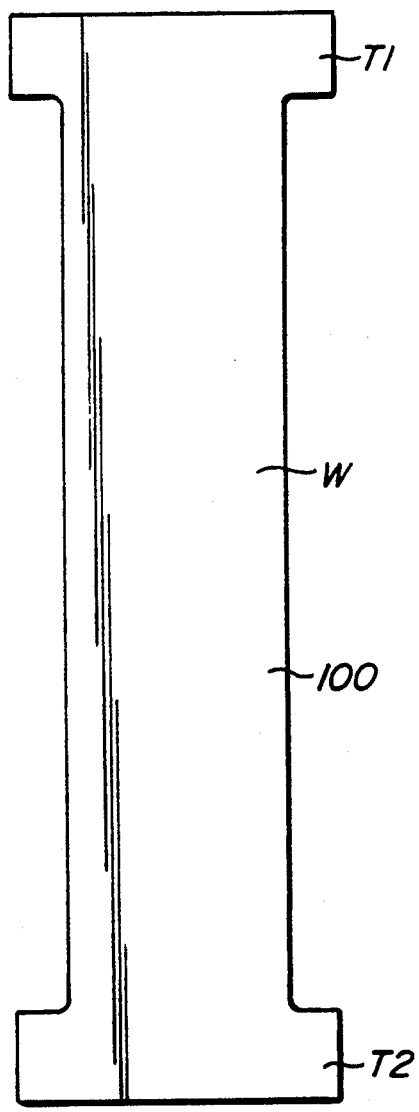

SWIRL VANES IN INCONEL SPACER

This invention relates to spacers for boiling water nuclear reactors. More particularly, in an Inconel spacer matrix, a novel type of swirl vane is added to the regular spacer matrix which does not interfere with spacer dimension for preferable addition to those spacers of the fuel bundle in the upper two phase region of the reactor.

BACKGROUND OF THE INVENTION

In Johansson et al. U.S. Pat. No. 4,913,875 issued Apr. 3, 1990 and entitled Swirl Vanes Integral with Spacer Grid, I disclosed (with co-inventor Louis C. Bulger) a spacer matrix in which the swirl vanes had the simultaneous function of providing centrifugal steam water separation as well as maintaining the spaced apart relationship of the fuel rods.

Over this design, there remains a need to add swirl vanes to conventional Inconel spacers. Accordingly, in what follows, I teach a spacer modification where swirl vanes can be easily added to conventional Inconel spacer matrices.

In U.S. Pat. No. 5,089,221 entitled Composite Spacer with Inconel Grid and Zircaloy Band, an example of a typical grid to which the swirl vane of this invention can be added is set forth at FIGS. 1C and 2B. Accordingly, for the disclosures of these Inconel spacer grids, that Johansson et al. Patent Application is incorporated to this disclosure by reference.

STATEMENT OF THE PROBLEM

Inconel spacers are typically constructed out of extremely thin Inconel sheet in the order of 0.010 inches thick. This thickness is utilized because of the relatively high cross-section of Inconel relative to thermal neutrons. Simply stated, Inconel tends to absorb such neutrons at a greater rate than Zircaloy—an alternate but thicker material from which spacers are constructed.

Inconel spacers are utilized in those fuel bundles having fuel rods in relatively high density matrices. For example, in the past 8 by 8 matrix arrays were utilized. Presently, matrices having 10 by 10 arrays of fuel rods are utilized. Because the fuel rods themselves are smaller and must be placed in a tighter side-by-side relationship, the relatively thin construction of an Inconel spacer is required.

In these denser fuel rod arrays, more precision is required in the center to center spacing of adjacent fuel rods. This being the case, where a spacer consists of a group of cells, all cells must have uniform spacing.

To incorporate swirl vanes into such spacers, it is not possible to structurally sandwich the metal from which the spacers are constructed between adjacent Inconel cells. Such placement would adversely effect the center to center spacing of the cells. While it may be possible to change the individual dimension of such cells to accommodate sandwiching of the material of the swirl vanes in between the cells, such a cell design would require different dimensions (and orientations) of the individual cells making up a spacer. This would render the manufacture of such a spacer not practicable.

The problem therefore becomes to place the swirl vanes into the cells of an Inconel spacer while maintaining precise center to center designed spacing of identically designed individual cells utilized in making up a spacer.

It will be further understood that once Inconel is utilized for the metal of a spacer, only Inconel as a practical matter can be used for the remaining material of the spacer, including the swirl vane. This restriction exists because of the difficulty of bonding dissimilar metals such as Inconel and Zircaloy.

The reader will understand that discovering the problem to be solved can constitute invention. Consequently, in so far as the statement of the problem sets forth novel subject matter, invention is claimed.

SUMMARY OF THE INVENTION

Swirl vanes are added to a spring metal grid spacer utilized with a conventional fuel bundle within a boiling water nuclear reactor. The conventional fuel bundle includes a matrix of vertical fuel rods, a lower tie plate for supporting the fuel rods and permitting the inflow of water, an upper tie plate for maintaining the fuel rods in the vertical disposition and permitting the outflow of water and generated steam. A channel surrounds the fuel rods to establish a flow path for water and steam between the tie plates through the fuel bundle. The spacers are located at varying elevations along the fuel rods and within the fuel bundle channel and includes a matrix of fuel rod containing cells for spacing the individual fuel rods one from another. Each cell has one or more spring legs and top and bottom fuel rod encircling arms. The spring legs function to bias a fuel rod contained within the cell to one side of the cell. The two rod encircling arms define stops against which the fuel rod is biased. The cells themselves are welded into a unitary matrix and are preferably surrounded by a metallic band.

The improved swirl vane and process of installation of the swirl vane of this invention includes an "I" shaped spring steel strip. This strip includes top and bottom tabs for engaging the respective top and bottom grid structures of the spacer. The "I" shaped strip is then twisted to provide the swirl vane surface, this twisting being preferably slightly less than or greater than the total twist when installed in the spacer. Thereafter, the strip is inserted to the grid and the excess twist is used to wedge the band in place until after joining, such as welding, has been utilized to secure the vane in place.

OTHER OBJECTS, FEATURES AND ADVANTAGES

An advantage of the disclosed swirl vane construction and process of installation is that such swirl vanes are easily added to conventional Inconel matrix spacers. Such addition occurs by first twisting the swirl vane to spring load the tab ends into place, registering the vane within the matrix of the spacer, and finally releasing the vane. With such action, the spacer holds itself into place until welding can easily occur.

An additional advantage of the disclosed construction is that the insertion of the swirl vane incidentally adds to the structural stability of the spacer. A strong spacer results once addition of the swirl vanes is complete.

Another advantage of the disclosed spacer construction is that placement of swirl vanes can easily be limited to less than all of the locations within a spacer. For example, it may be desirable to place swirl vanes only in alternate cell locations.

Another advantage is that swirl vanes can be added to only one or more spacers in the upper two-phase region of a fuel bundle while using a common grid and cell design for all the spacers.

BRIEF DESCRIPTION OF THE DRAWINGS

Other objects, features and advantages of the disclosed invention will become more apparent after referring to the following specification and attached drawings in which:

FIGS. 4A and 4B show respective side elevation and top plan of a swirl vane strip before twisting;

FIGS. 5A and 5B show respective side elevation and top plan of the strip after twisting;

DESCRIPTION OF THE PREFERRED EMBODIMENT

Figure 1:
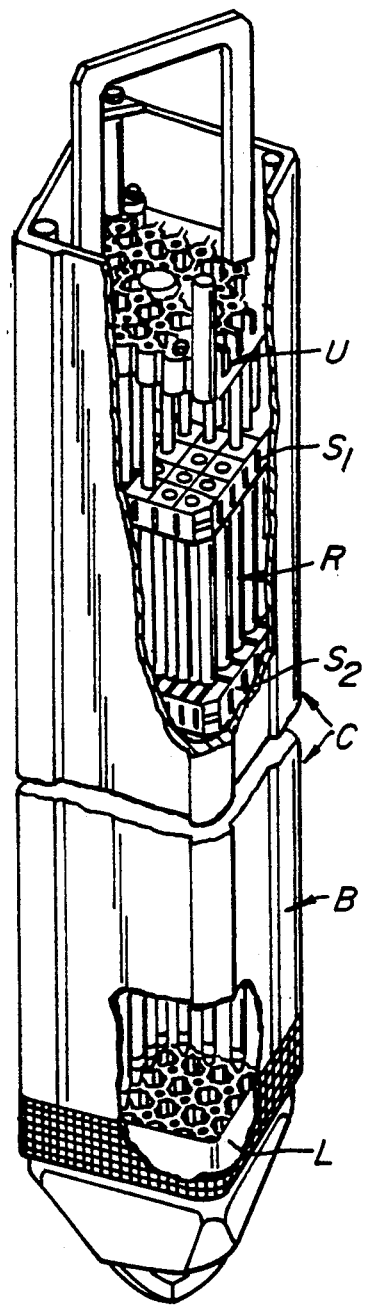
FIG. 1 is a perspective view of a nuclear fuel bundle with the side of the channel surrounding the fuel bundle being cut away so that location of the improved spacers of this invention can be understood.

Referring to FIG. 1, a fuel bundle B is illustrated, having its surrounding channel C broken away, so that the interior construction can be understood. A lower tie plate L is shown, and with an upper tie plate U. The matrix of vertically upstanding rods R (preferably in the order of 10×10) are shown. The spacers, which are the subject matter of this invention, are illustrated here as the upper two spacers S1 and S2. The reader will understand that normally seven to nine spacers are utilized along the length of the entire fuel bundle.

The function of the spacers can be simply understood. Specifically, the spacers have the function of maintaining the fuel rods in their designed side-by-side relation. Additionally, and as the swirl vanes of this invention make more apparent, the secondary function of the spacers is realized in the upper two-phase region of the fuel bundle B. Specifically, the spacers add turbulence to the passing two-phase mixture. Where swirl vanes are utilized, the spacers typically cause the higher density water to be impelled to and on fuel rods. At the same time, the vapor tends to pass upwardly in those regions defined between the fuel rods.

Figure 2:
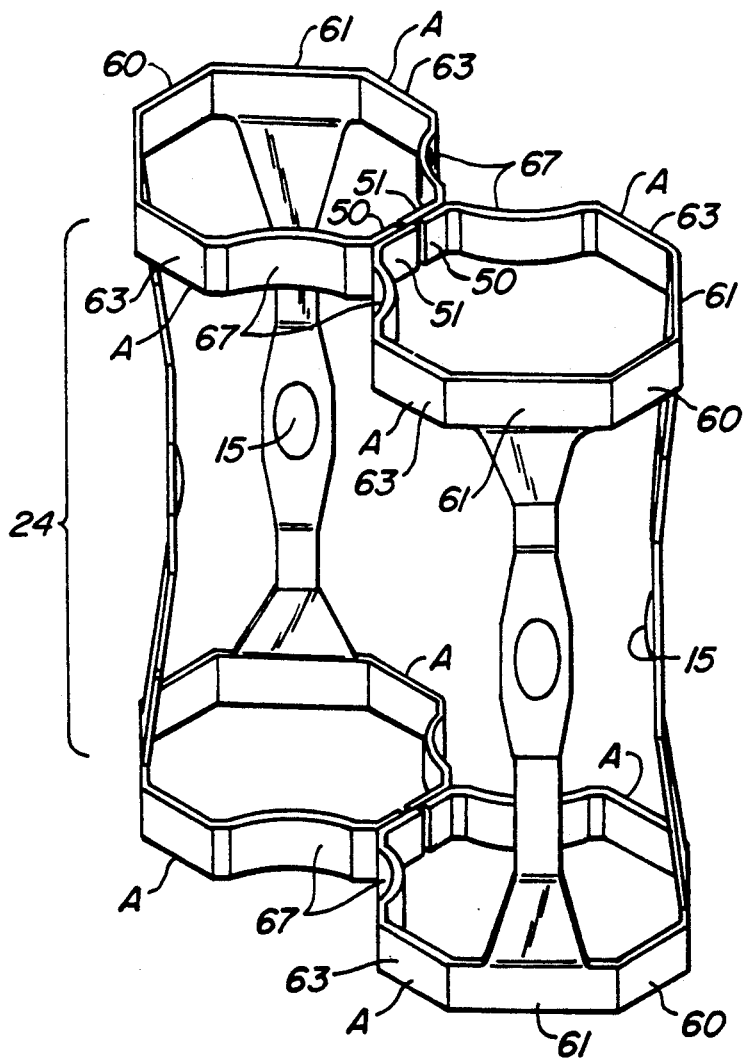
FIG. 2 is a perspective view of a pair of spacer cells utilized in the prior art.

Turning to FIG. 2, a typical unit cell pair from a spacer matrix can be described. The cells have upper and lower rod encircling arms A. The configuration of these arms as they surround an individual rod can be set forth. The arms include a back portion 60, spring portions 61, side portions 63, stop portions 67, and finally the foreshortened tab 50 and the long tab 51.

The springs spanning between the rod encircling arms can now be understood.

Two separate spring members 24 extend between the upper and lower arms of each cell. Rod contacting dimples 15 protrude from the middle of each spring. When a fuel rod is inserted into the cell, the springs 24 push the rod against the upper and lower stops 67.

Figure 3:
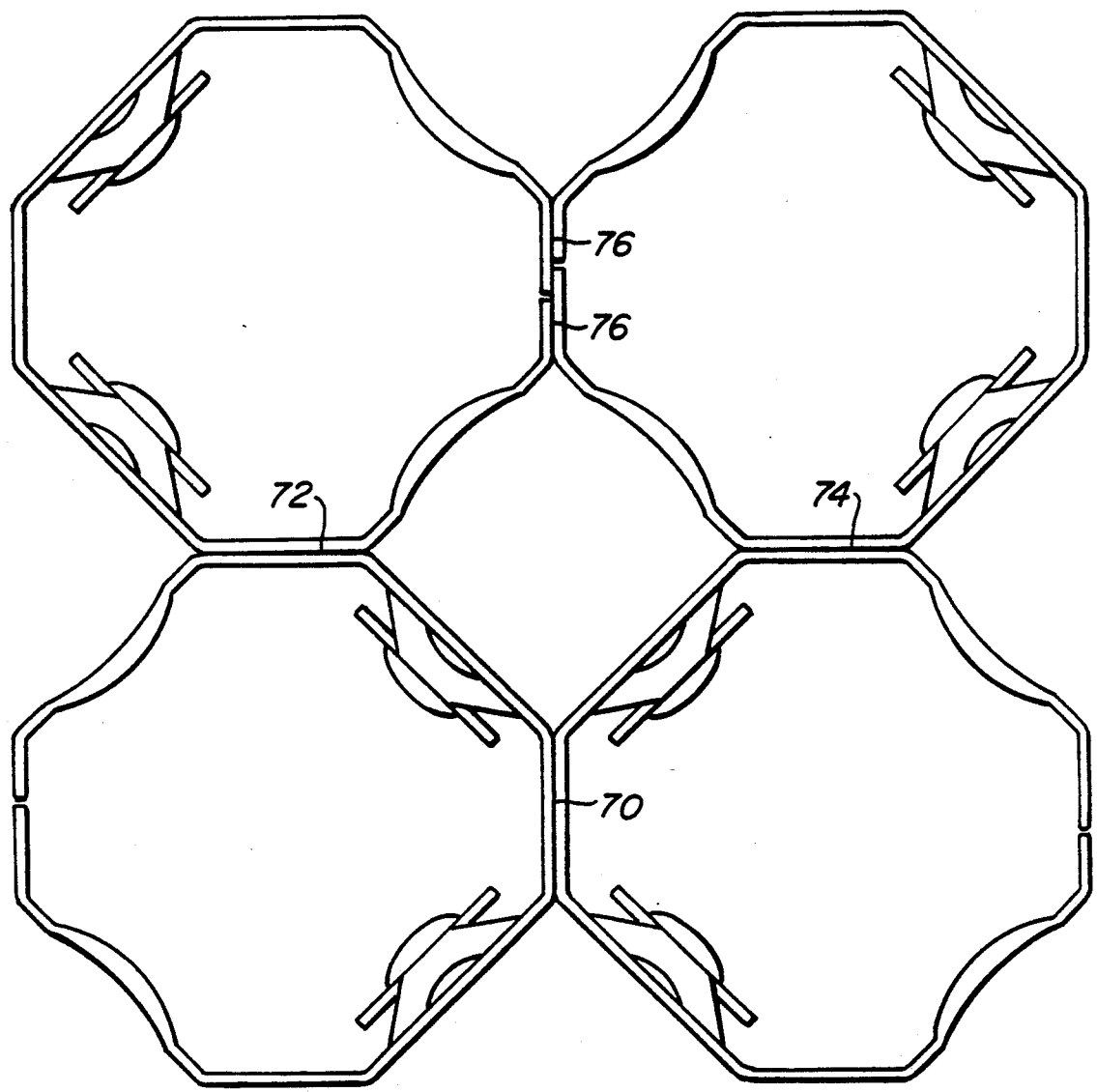
FIG. 3 is a top plan view of four spacer cells, the cells being shown without fuel rods.

The two cells of the pair are welded together at the abutting tabs 50, 51. Cell pairs are then welded together as illustrated in FIG. 3, which shows a plan view of a portion of a spacer consisting of four cells. Welds are made between the abutting portions of the rod encircling arms at 70, 72, 74, 76. By extending this grid to the particular matrix of fuel rods present, a spacer is constructed.

The construction here illustrated is set forth in U.S. Pat. No. 5,089,221 entitled COMPOSITE SPACER WITH INCONEL GRID AND ZIRCALOY BAND.

Referring to FIGS. 4A and 4B, a swirl vane strip W is illustrated before twisting. The strip is I-shaped, having an elongated shank 100, with upper and lower tabs T1, T2. Referring to FIG. 4B, each tab has fastening portions 103, 104, which are typically bent at small obtuse angles in anticipation of fastening to the spacer as illustrated in FIG. 6.

FIG. 5A and FIG. 5B show side elevation and top views, respectively, of a swirl vane after twisting over an approximate angle of 180°. Angles of twist of either 90° or 270° can also be used. In the preferred embodiment of this invention, twisting occurs to an extent slightly greater than, or slightly less than the final twist when incorporated into the spacer.

Figure 6:
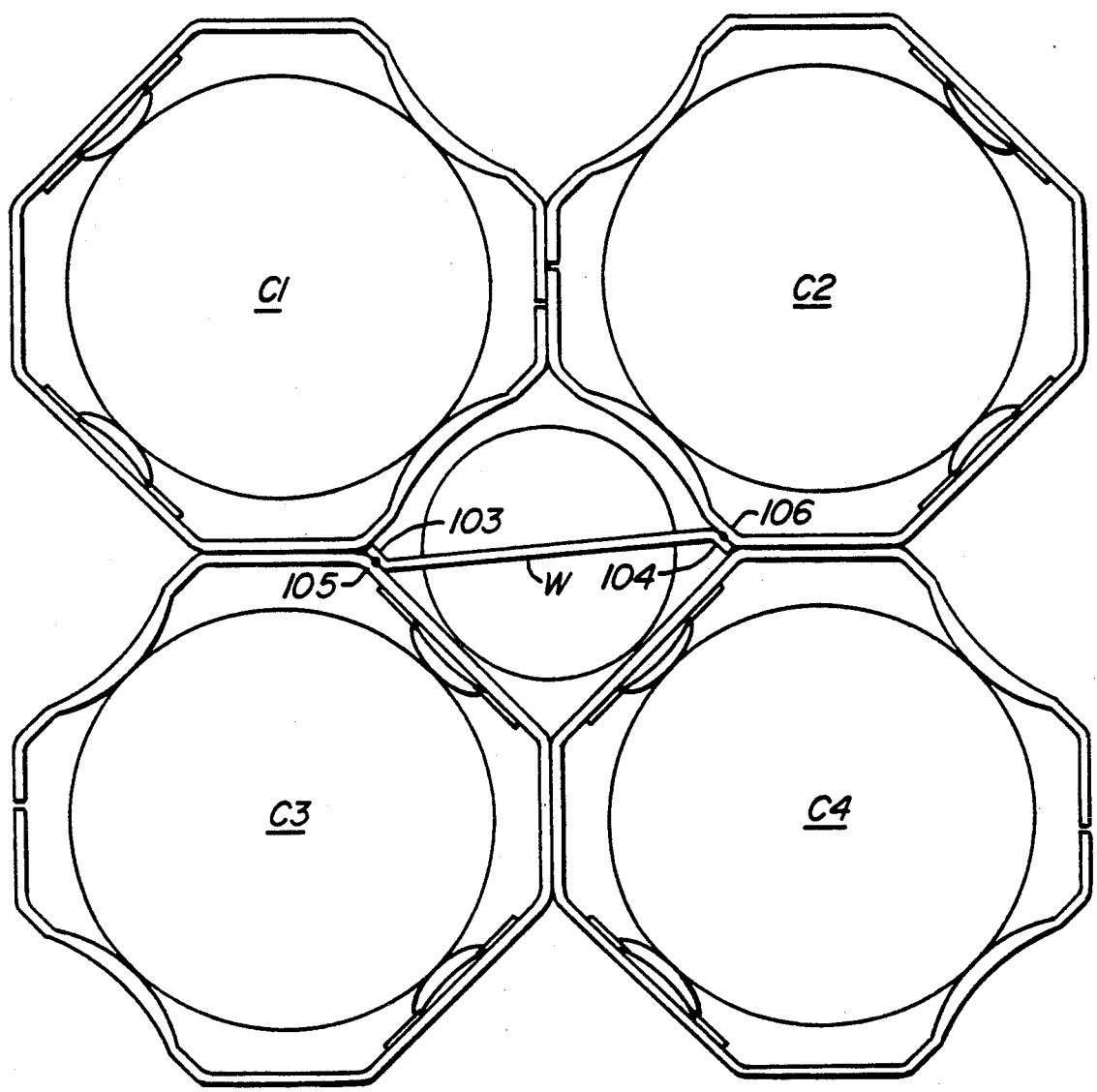
FIG. 6 is a top plan view of four spacer cells of FIG. 3 with a swirl vane of FIGS. 5A and 5B in the region between the cells.

Having set forth this much, attention may now be directed to FIG. 6 to understand the insertion of the swirl vanes.

First a complete set of cells is assembled to form a spacer. FIG. 6 shows a top view of four cells C1, C2, C3, and C4 of a spacer with a swirl vane in place. To insert the swirl vane, it is gripped at the top and bottom tabs T1 and T2 (see FIG. 5A) and a small twist is applied so that the angle between the upper and lower tabs are precisely 180°. The tabs are held in this orientation with an assembly tool. The swirl vane is then inserted into the region bounded by four cells, and released.

After release, the tabs T1 and T2 try to return to their original relative orientation, but are restrained by the surrounding cells. This restraint locks the swirl vane into position until it can be welded to the surrounding cells. Referring again to FIG. 6, the tab ends 103 and 104 contact the cell sides at locations 105 and 106, at the top and bottom of the cells. Welds are made at locations 105 and 106.

Figure 7A:
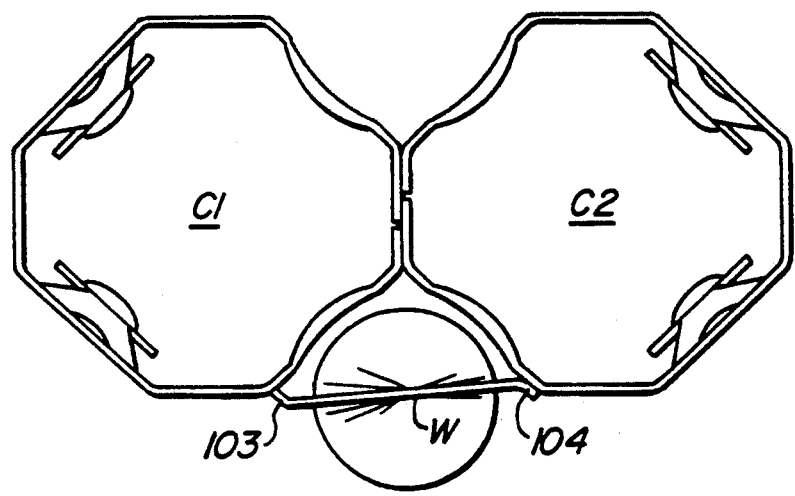
FIGS. 7A and 7B are top plan and side elevations that further illustrates placement of a swirl vane relative to a pair of spacer cells.
Figure 7B:
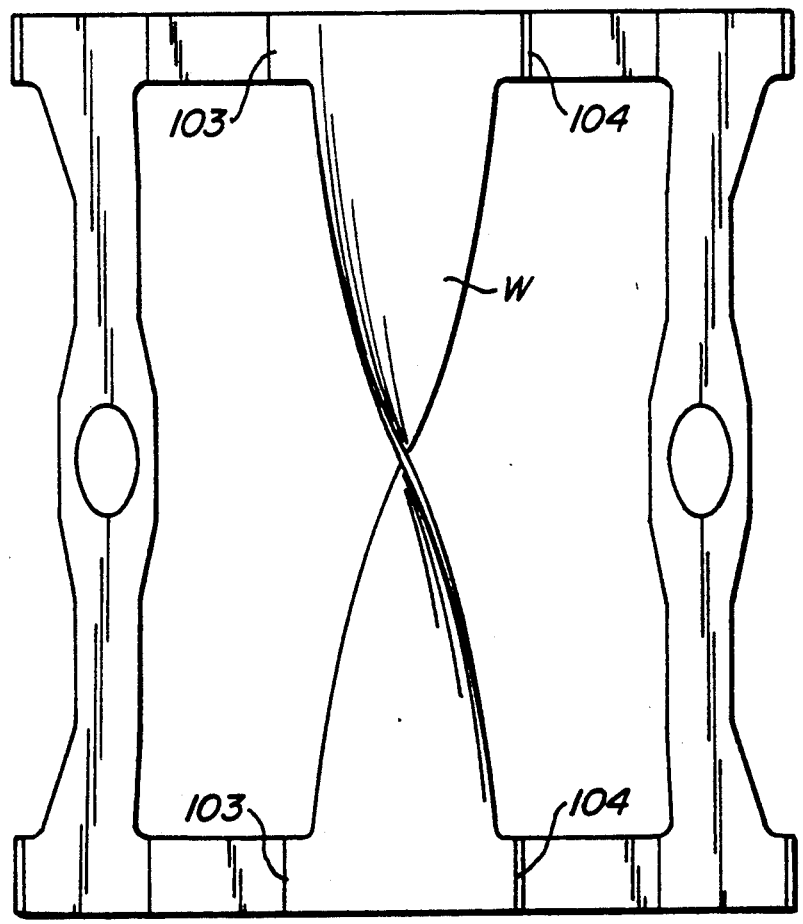

FIGS. 7A and 7B further illustrate the positioning of a swirl vane. FIG. 7A is a top view and FIG. 7B a side elevation view of two cells and a swirl vane. These cells, C1 and C2, correspond to cells C1 and C2 of FIG. 6.

The reader will note that the above-described attachment of swirl vanes W to the spacer S occurs without changing the dimensions of the Inconel spacer. Further, the attached swirl vanes do not function to locate the fuel rods in the spacer. However, the swirl vanes serendipitously increase the strength of the spacer to which they are attached.

Figure 8:
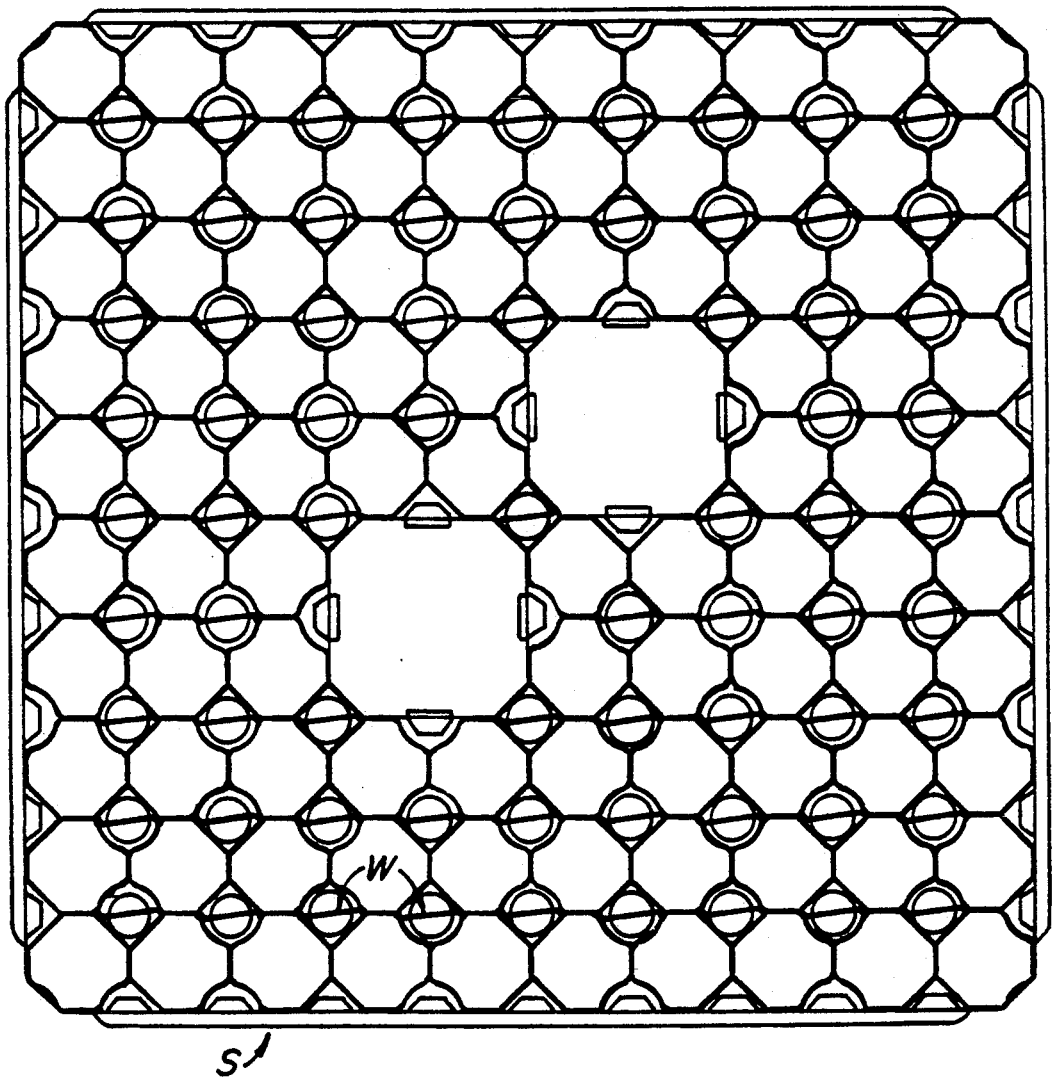
FIGS. 8 and 9 show plan views of a 10×10 spacer illustrating respective full placement and alternate placement of swirl vane locations in a spacer.
Figure 9:
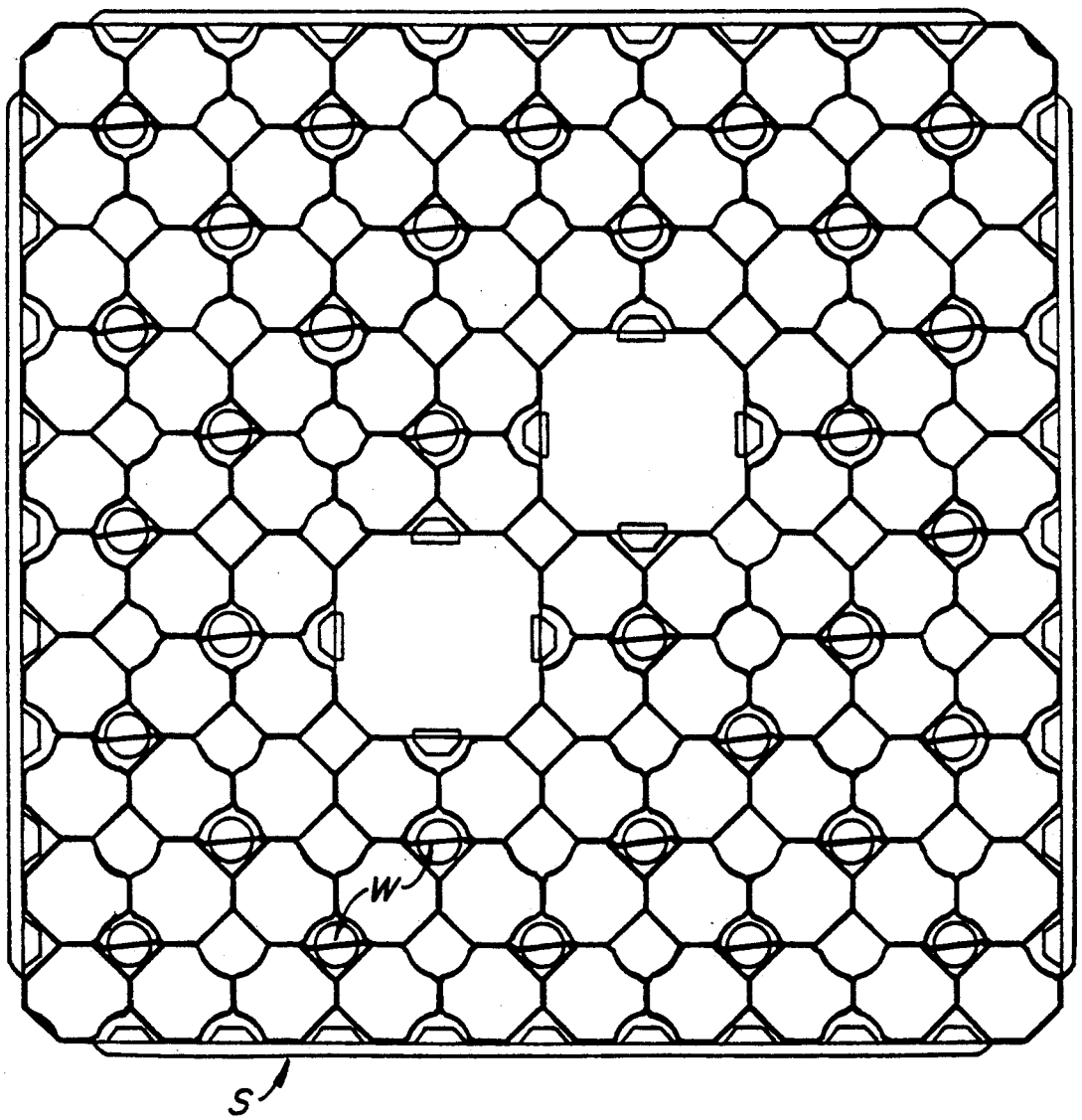

Swirl vanes can be inserted at all available locations in a spacer, or in selected locations. FIG. 8 shows a plan view of a 10×10 spacer with swirl vanes in all the available locations. FIG. 9 shows the same spacer with swirl vanes in half of the available locations, skipping alternate locations. Many other patterns of swirl vane placement can be used. For example, swirl vanes could be placed adjacent to the highest power fuel rods.

Figure 10B:
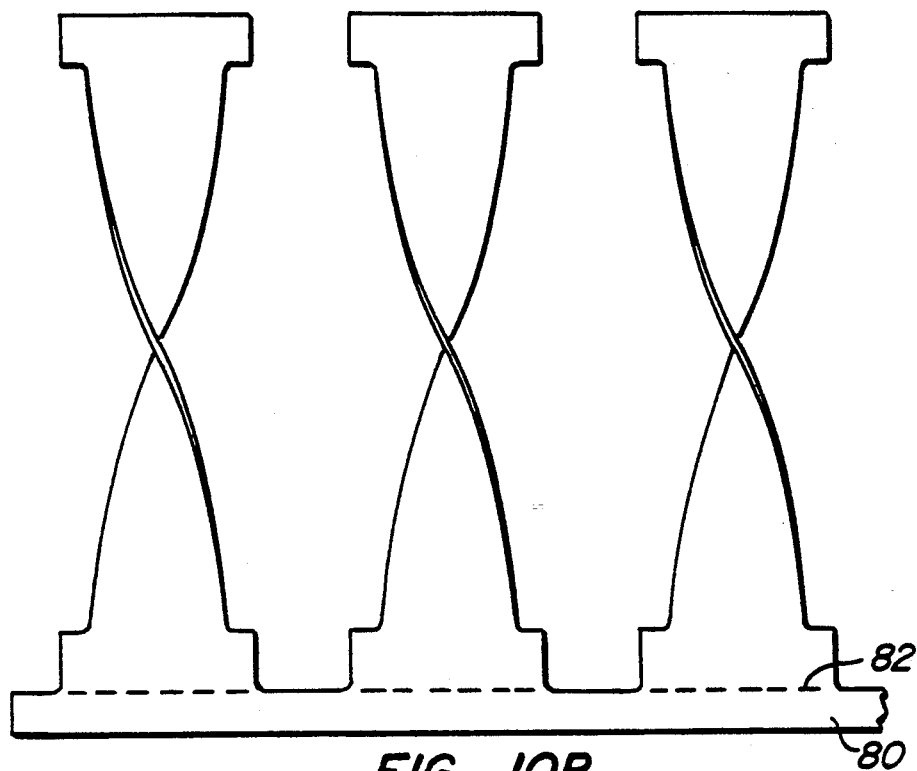
FIGS. 10A and 10B illustrate side elevations of an alternate embodiment of swirl vanes having a lower common web for placement to an Inconel spacer.
Figure 10A:
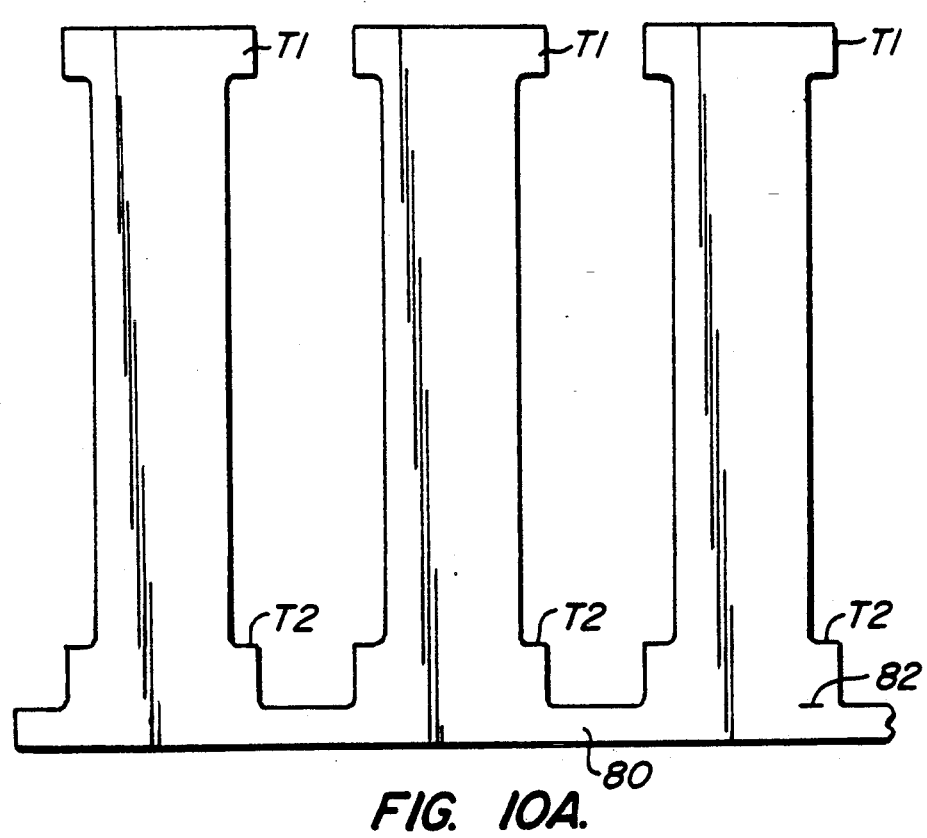

In an alternate embodiment, rows of swirl vanes are stamped from a long strip of material with their upper or lower ends connected. A portion of such a row of swirl vanes is shown in FIG. 10A, prior to twisting. The region 80 below the dashed line 82 is the connecting member, and the material above the dashed line 82 defines swirl vane strips identical to those shown on FIG. 4A. FIG. 10B shows the swirl vanes of FIG. 10A after twisting each swirl vane strip 180°.

When inserting the swirl vanes into a spacer, all the swirl vanes on one connecting strip are inserted simultaneously. This greatly reduces the number of separate pieces which must be handled. In this case the swirlers are twisted to exactly 180° so that no additional twist is required to insert the swirlers.

Figure 11A:
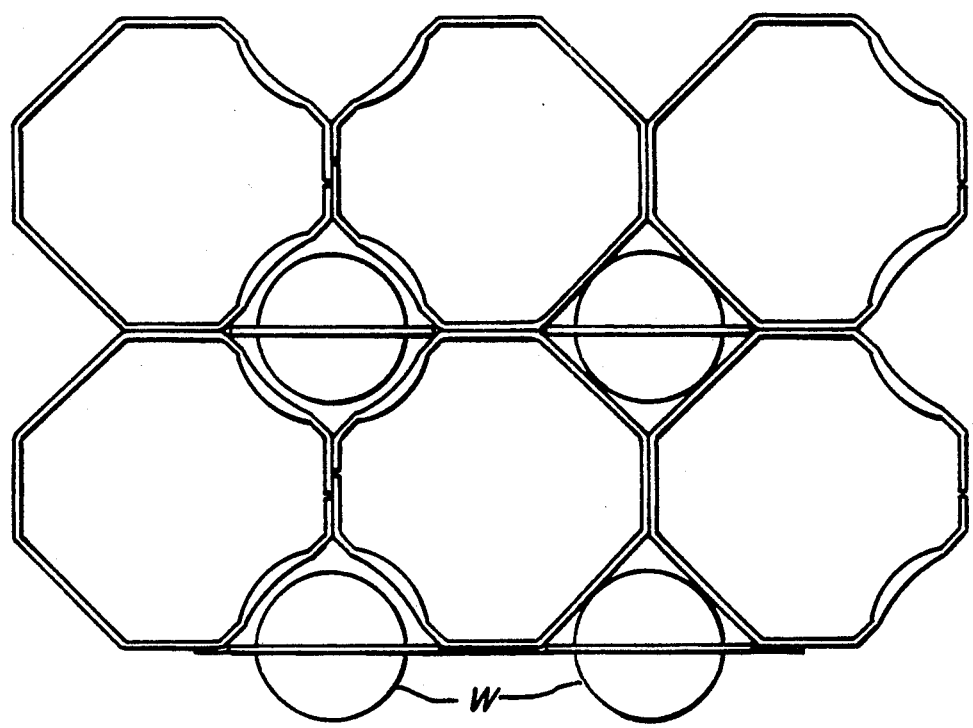
FIG. 11A and 11B are respective side elevation and plan views of the swirl vane of FIG. 10B incorporated to a spacer matrix, it being noted that the common web of the spacer matrix is below the spacer ferrules to avoid interfering with the center to center spacing of the ferrules.
Figure 11B:
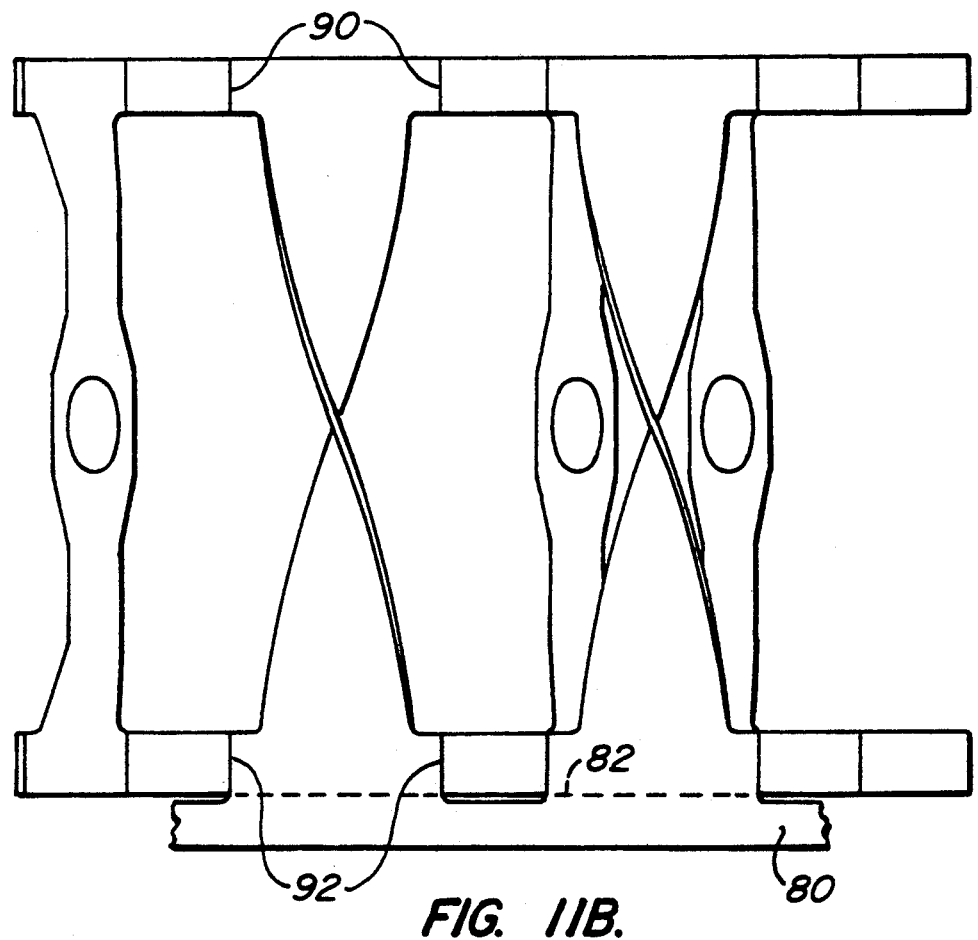

FIGS. 11A and 11B illustrate placement of swirl vanes in a spacer according to this embodiment. FIG. 11A is a top view of six cells of a spacer containing swirl vanes. FIG. 11B is a side elevation view. The connecting strip 80 extends below the spacer. Welds are made at the ends of the swirl vane tabs T1 at location 90 on the top of the spacer. The spacer is then inverted, the connecting strips 80 are machined away and welds are made to tabs T2 at locations 92.

In summary, swirl vanes can be easily and selectively assembled into a spacer, at selected locations in the spacer. The addition of swirl vanes adds to the structural stability of the spacer and does not change the spacer component dimensions. A common matrix and cell design can be used for all the spacers of a fuel bundle. Swirl vanes are incorporated into one or more of the upper spacers where they are needed.

Finally, the added Inconel material of the swirl vanes constitutes a neutron absorbing poison. The I-shaped configuration (see FIG. 4) combined with the use of swirl vanes in only a few of the spacers of a bundle minimizes the amount added Inconel.

What is claimed is:

1. A swirl vane for addition to a spring metal grid spacer utilized within a fuel bundle for a conventional nuclear boiling water nuclear reactor, said fuel bundle including a matrix of vertical fuel rods, a lower tie plate for supporting the fuel rods and permitting the inflow of water, an upper tie plate for maintaining the fuel rods in the vertical disposition and permitting the outflow of water and generated steam, a channel for surrounding the fuel rods between the tie plates to establish a flow path of water and steam between the tie plates through the fuel bundle and a plurality of spacers at differing elevations interior of said channel and forming individual containment cells around the fuel rods,
wherein each said spacer includes:
one or more spring legs and at least upper and lower fuel rod encircling arms, said spring leg functioning to bias a fuel rod contained within the cell at the spacer to one side of the cell and said two rod encircling arms defining stops against which said fuel rods are biased,
said cells joined into a unitary matrix at said upper and lower rod encircling arms whereby said upper arms form an upper grid in said spacer and said lower arms form a lower grid in said spacer, an improved swirl vane comprising:
a spring steel strip, said strip including top and bottom tabs for engaging the respective top and bottom grid structure of the spacer and forming said top and bottom portions of said strip, said tabs having a width for placement to said grid at locations outside of said rod encircling arms;
said strip being twisted between said tabs to provide the swirl vane surface;
means for securing said vane at said upper and lower grids for joining said swirl vanes to said spacer.

2. The invention of claim 1 and wherein said spring steel strip is an "I" shaped band, and wherein said top and bottom sections of said "I" form said tabs.

3. The invention of claim 1 and wherein said twisting of said "I" shaped strip being preferably slightly less than or greater than the total twisting required for placement, wedging and later attachment of said tabs to surfaces defined by said top and bottom grids, whereby said strip is twisted with sufficient force to remain wedged into place between said grid structures before attachment.

4. The invention of claim 1 and wherein said swirl vanes at one of said tabs comprise a common strip at one of the tabs of the swirl vane for joining all said swirl vanes along a row of said matrix cells in a common single piece.

5. The invention of claim 4 and wherein said swirl vane at said common strip joining said swirl vanes extends below said rod encircling arms.

6. A process for the addition of a swirl vane to a spring metal grid spacer utilized within a fuel bundle for a conventional boiling water nuclear reactor;
said fuel bundle including a matrix of vertical fuel rods, a lower tie plate for supporting the fuel rods and permitting the inflow of water, an upper tie plate for maintaining the fuel rods in the vertical disposition and permitting the outflow of water and generated steam, a channel for surrounding the fuel rods between the tie plates to establish a flow path of water and steam between the tie plates through the fuel bundle and a plurality of spacers at differing elevations interior of said channel and forming individual containment cells around the fuel rods,
wherein each said spacer includes:
one or more spring legs and at least an upper and lower fuel rod encircling arms, said spring leg functioning to bias a fuel rod contained within the cell at the spacer to one side of the cell and said two rod encircling arms defining stops against which said fuel rods are biased on an opposite portion of said cell,
said cells joined into a unitary matrix at said upper and lower rod encircling arms whereby said upper arms form an upper grid in said spacer and said lower arms form a lower grid in said spacer, the process for adding the swirl vanes comprising the steps of:
providing a spring steel strip, said strip including top and bottom tabs for engaging the respective top and bottom grid structures of the spacer and forming said top and bottom portions of said swirl vane, said tabs having a width for placement to said grid at locations outside of said rod encircling arms;
twisting said strip between said tabs to provide the swirl vane surface;

securing said vanes at said tabs to said upper and lower grids for joining said swirl vanes to said spacer.

7. The process of claim 6 and including the further steps of providing said spring steel strip in an "I" shaped strip, wherein said top and bottom sections of said "I" form said tabs.

8. The process of claim 6 and wherein said twisting step of said strip includes twisting said band less than or greater than the total twisting required for placement and later attachment of said tabs to surfaces defined by said top and bottom grids,
  twisting said strip to place said tabs to said grids, and,
  releasing said twist with said tabs abutting said upper and lower grid with sufficient force whereby said strip is wedged into place in said grid.

9. The process of claim 6 and wherein all said strips are affixed to a common band and wherein said twisting step includes twisting all said strips relative to said common band and said securing step includes inserting all said twisted strips into said upper and lower matrices utilizing said common band.

* * * * *